Nov. 26, 1963
S. D. TINE
3,112,013
INJECTION LUBRICATOR
Filed July 17, 1961
3 Sheets-Sheet 2
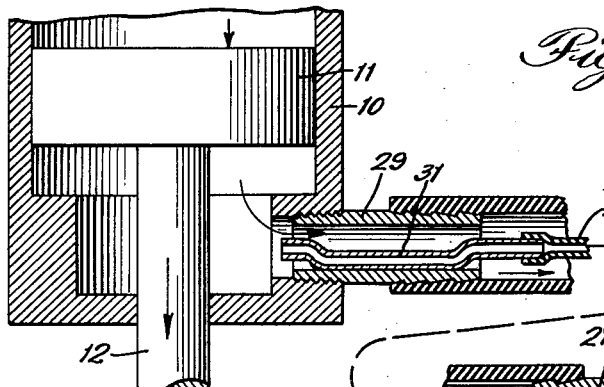
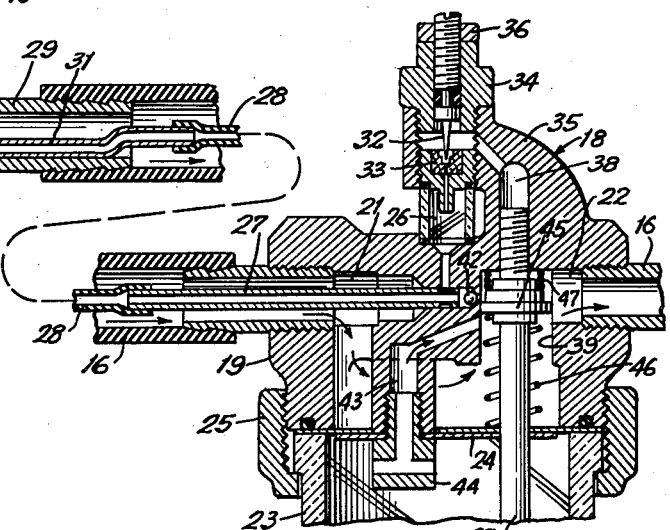
INVENTOR:
Sebastian David Tine,
BY Bair, Freeman & Molinare
ATTORNEYS.

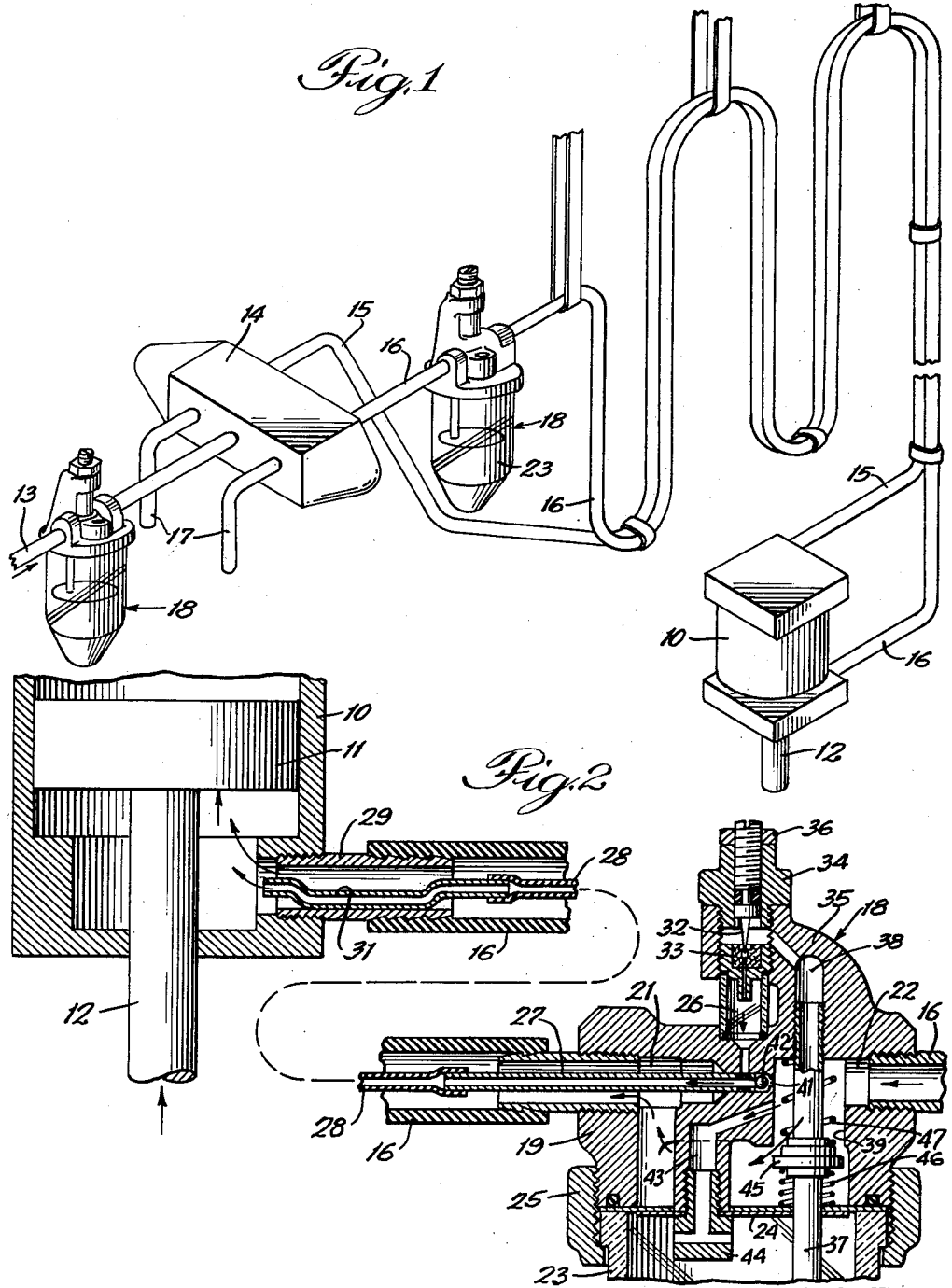

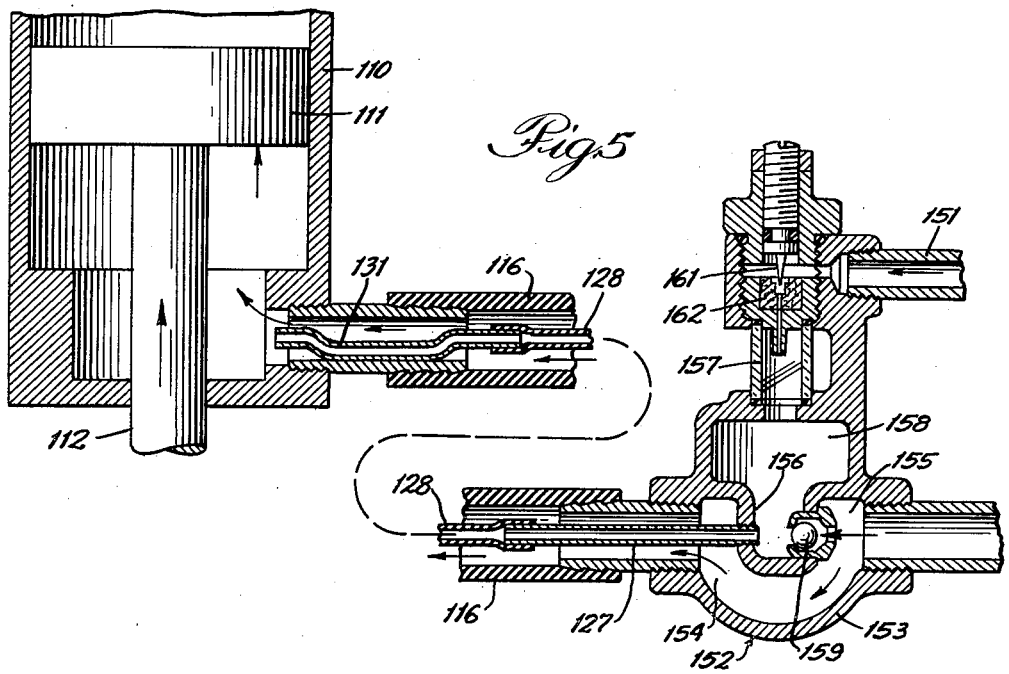
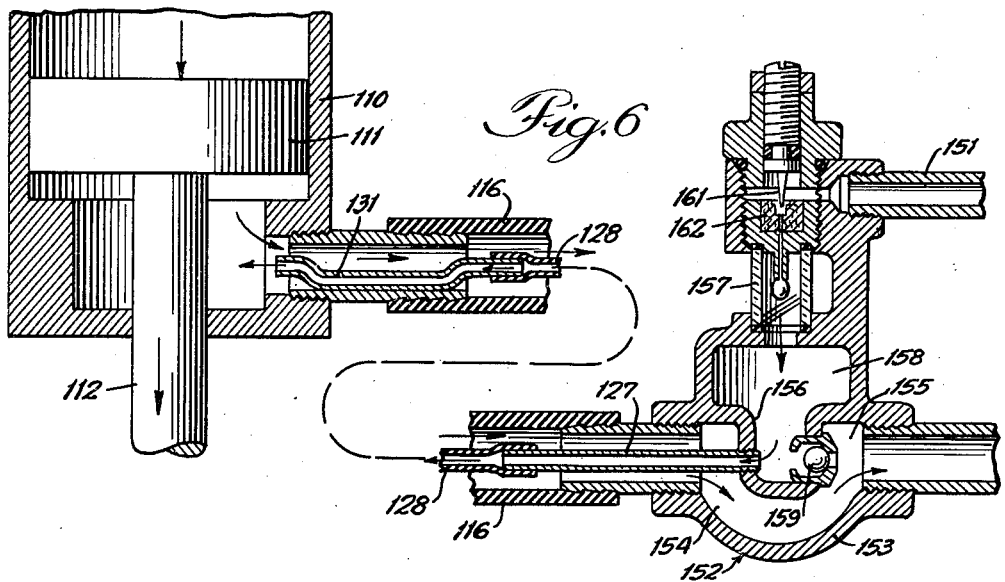

3,112,013
INJECTION LUBRICATOR
Sebastian David Tine, Lawrence, Mass., assignor to Watts Regulator Company, Lawrence, Mass., a corporation of Massachusetts
Filed July 17, 1961, Ser. No. 124,662
14 Claims. (Cl. 184—18)

This invention relates to injection lubricators and more particularly to devices for injecting oil or other liquid lubricants into air consuming devices, such as air cylinders and the like, during operation.

It has heretofore been proposed to mount a lubricator in an air supply line leading to an air motor, or the like, to inject lubricant into the air thereby to lubricate the air motor. Such lubricators are entirely satisfactory for most mechanisms which consume an appreciable quantity of air during operation, but do not provide sufficient lubrication for devices which consume relatively little air, such as short stroke air cylinders.

It is accordingly an object of the present invention to provide an injection lubricator which injects lubricant directly into an air consuming device, such as an air cylinder, on each operation thereof regardless of the amount of air consumed in the operation of the device.

Another object is to provide an injection lubricator in which lubricant is conducted directly to the air consuming device separately from the air itself and in measured quantities which are not necessarily proportional to the air flow.

According to a feature of the invention, lubricant is conducted from a lubricant-receiving chamber in the lubricator to the device under air pressure once for each operating cycle of the device. The quantity of lubricant so supplied to the device can be adjusted independently of the volume of air flowing so that proper lubrication of the device is insured regardless of the fact that the air consumption may be very small.

The above and other objects and features of the invention will be more readily apparent from the following description when read in connection with the accompanying drawings, in which:

FIGURE 1 is a perspective diagrammatic view illustrating an air motor system embodying an injection lubricator according to the invention;

FIGURE 2 is a partial section through the lubricator and one end of the air cylinder;

FIGURE 3 is a section similar to FIGURE 2 showing another position of the parts;

FIGURE 4 is a view similar to FIGURE 1 showing an alternative arrangement;

FIGURE 4a is a reduced diagrammatic view illustrating a modified arrangement similar to FIGURE 4;

FIGURE 5 is a section through the lubricator of FIGURE 4 and one end of the cylinder; and FIGURE 6 is a view similar to FIGURE 5 showing the parts in a different position.

The system, as shown in FIGURE 1, includes a short stroke air cylinder, indicated generally at 10, and which, as shown in FIGURE 2, comprises a short cylinder in which a piston 11 is slidable. A piston rod 12 connected to the piston may extend through one end of the cylinder for connection to a part to be operated thereby.

The cylinder is supplied with operating air under pressure through a conduit 13 from a compressor or other source of air or gas under pressure. The conduit 13 leads to a reversing valve 14 which may be a conventional piston type valve to connect the conduit 13 to either of two conduits 15 and 16 leading from the reversing valve to the opposite ends of the cylinder 10, as shown. When one of the conduits 15 or 16 is connected to the supply conduit 13, the other is vented to atmosphere or other desirable low pressure space through a vent connection 17 to the reversing valve 14. Since this construction, as so far described, is conventional no further detailed description thereof will be given.

In the system, as shown in FIGURE 1, an injection lubricator, as indicated generally at 18, is mounted in each the air supply conduit 13 to lubricate the valve 14 and in the conduit 16 to lubricate the air cylinder 10. Since the injection lubricators may be identical, only one of them will be described in detail.

Each injection lubricator, as best seen in FIGURES 2 and 3, comprises an upper casing part 19 which is of generally inverted cup-shape and which may be formed by a tight casting, or the like. The casing 19 is provided with opposed ports 21 and 22 therein which are connected into the conduit 16, as shown. The port 22 is preferably connected through one section of the conduit 16 to the valve 14 while the other port 21 is connected through a section of the conduit 16 to the air cylinder. To the lower edge of the casing there is sealingly secured a reservoir 23 which may be formed of glass or similar plastic material to contain a body of oil or other liquid lubricant to be employed. The space within the reservoir is separated from the space within the casing 19 by a partition 24 which is sealed between the edges of the reservoir and the casing, as shown in FIGURES 2 and 3. The reservoir may be secured to the casing through a threaded collar 25 having an inturned annular projection thereon engaging a shoulder at the top of the reservoir and threaded onto the lower part of the casing.

The interior of the casing defines a lubricant-receiving chamber 26 which may be formed by a transparent sight tube extending above the casing 19 and communicating with a lubricant-conveying tube 27 fitting into the casing and projecting through the port 21. A flexible tube 28 may be secured to the outer end of the tube 27 and may extend through the conduit 16 which is also illustrated as a flexible conduit to a nipple 29 secured to the end of the flexible conduit 16 and to the air cylinder. The flexible tube 28 is connected to a reduced rigid tubular extension 31 within the connector 29 and projects therethrough into the air cylinder, as seen in FIGURES 2 and 3.

Lubricant is supplied to the lubricant-receiving chamber 26 under the control of a needle valve 32 which extends into a body of felt, or the like, shown at 33. By moving the needle valve more or less into the felt the felt will be compressed to a greater or lesser degree to provide more or less restriction to flow of lubricant therethrough. By this means, the rate of lubricant flow can be very accurately adjusted so that the proper amount of lubricant will be supplied to the air cylinder. It will be understood that lubricant is to be supplied in relatively small quantities, on the order of one drop per minute of operation of the air cylinder. For adjusting the valve it is threaded into a collar 34 at the upper end of an extension 35 of the casing 19 and may be held in adjusted position by a locking nut 36.

A tube 37 extends from the lower part of the reservoir 23 through the partition 24 and communicates with a passage 38 in the extension 35 which in turn communicates with the top portion of the felt pad 33. When the reservoir is subjected to pressure, as described hereinafter, the lubricant therein will be forced upward through the tube 37 and passage 38 to pass the valve 32 and felt pad 33 at an accurately regulated rate.

Lubricant from the lubricant-receiving chamber 26 will flow directly into the lubricant-discharge tube 27 and may be forced therefrom by air under pressure flowing to the air cylinder. For this purpose, the casing 19 is formed in its upper part with a cylindrical bore 39. The bore 39 communicates at its upper end directly with the port 22 and through a restricted opening 41 and an inwardly opening check valve 42 with the lubricant-discharge tube 27. When there is lubricant in the tube and air under pressure is supplied thereto past the check valve 42 the air will force the lubricant directly through the tube 27, the flexible tube 28 and the discharge tube 31 directly into the air cylinder.

To supply air under pressure to the reservoir, the casing 19 is formed with a passage 43 therein communicating through a nipple 44 which is sealed to the partition 24 into the upper part of the reservoir 23. It will be noted that the open lower end of the bore 39 communicates through the hollow casing 19 itself directly with the port 21 and with the conduit 16 connected thereto.

The bore 39 slidably receives a floating piston 45 which fits slidably in the bore and normally occupies a position therein intermediate the positions shown in FIGURES 2 and 3. The floating piston 45 is urged to its intermediate position by opposing springs 46 and 47 and will move in either direction from its intermediate position in response to pressure differential thereacross. The normal position of the floating piston is such that communication between the ports 21 and 22 is prevented thereby but such that the port 22 is in communication with both the passage 41 and the passage 43.

In operation when the valve 14 is moved to a position to supply air under pressure to the conduit 16 the air will enter through the port 22 and through the passage 43 and nipple 44 and will produce a pressure in the reservoir to force oil therein upwardly through tube 37 to the felt pad 33. This oil will pass through the felt mass under the control of the valve 32 at a regulated rate into the lubricant-receiving chamber 26 and the lubricant-conducting tube 27. At the same time, the air under pressure will pass the check valve 42 into the lubricant receiving chamber 26 and the tube 27 to force oil in the chamber 26 and the tube 27 therethrough and into the air cylinder. At the same time, the air under pressure acting on the piston 45 will move it downward to the position shown in FIGURE 2 past the lower end of the bore 39. When the piston reaches this position the air will flow past it directly to the port 21 and to the air cylinder. It will be seen that with this construction the pressure in the conduit 16 and which is supplied to the air cylinder thereby will always be slightly greater than the pressure conducted past the check valve 42 to the tube 27 so that air will continue to flow through the tube 27 and to carry lubricant to the cylinder at the rate predetermined by the adjustment of the valve 32 while the cylinder is moving. At the end of the piston stroke the pressure will equalize and no further lubricant will be conducted to the cylinder.

When the valve 14 is reversed to exhaust through the line 16 the parts will occupy the position shown in FIGURE 3. When the conduit 16 between the lubricator and the valve is vented, the pressure at the port 22 will become less than that at the port 21 so that the piston 45 will be moved upwardly in the bore 39 to the position shown and the check valve 42 will be seated. The check valve will prevent any backing up of lubricant and will insure that the desired measured quantity of lubricant, as determined by the adjustment of the valve 32, is supplied to the cylinder. When the piston 45 moves upwardly, as shown in FIGURE 3, the port 21 will be connected directly therepast to the port 22 and the passage 43 will similarly be connected to the port 22 so that both the cylinder and the reservoir are vented. When the pressure in the cylinder and in the conduit 16 have been reduced substantially to atmospheric, the piston 45 will float to its normal position under the influence of the springs 46 and 47 ready for a subsequent operation. It will further be noted that with the parts in their vented or idle position, no additional lubricant will be forced upward through the tube 27 to the valve so an excessive quantity of lubricant cannot accumulate in the lubricant-receiving chamber 26 during periods when the cylinder is not being operated.

It will be understood that the operation of the lubricator 18 in the supply line 13 will be similar to that described above to supply measured quantities of lubricant to the valve 14 to insure proper operation thereof.

FIGURE 4 illustrates an alternative arrangement, parts therein corresponding to like parts in FIGURES 1 to 3 being indicated by the same reference numerals, plus 100. In this construction a lubricator 118 which may be identical with the lubricators described above is mounted in the supply line 113 leading to the valve 114 to lubricate the valve in the manner described above. In this construction a tube 151 is connected ao the lower part of the reservoir 123 and leads to an injector lubricator, indicated generally at 152, which replaces the lubricator between the valve 14 and the cylinder 10, as shown in FIGURES 1 to 3. The lubricator, as best seen in FIGURES 5 and 6, comprises a casing 153 having spaced ports 154 and 155 therein which are in communication through the hollow space within the casing. The casing is provided with a partition 156 therein defining, together with a sight glass 157, an enlarged lubricant-receiving chamber 158 which also serves as an air volume chamber as hereinafter described. A lubricant-conducting tube 127 communicates with this chamber and with a flexible tube 128 which extends through the conduit 116 in the same manner as in FIGURES 1 to 3. In addition, the lubricant-receiving chamber 158 communicates through an inwardly opening check valve 159 with the port 155.

Lubricant forced through the tube 151 is supplied to the lubricant-receiving chamber under the control of a valve 161 movable into a felt mass 162 to regulate the rate of flow of lubricant in the same manner as described in FIGURES 1 to 3.

In this construction when the supply conduit 113 is under pressure the lubricant in the reservoir 123 will be pressurized to flow through the tube 151 and past the valve 161 into the lubricant-receiving chamber 158 at an accurately regulated rate. When the valve 114 is moved to a position to connect the conduit 116 to the supply conduit 113, the parts will occupy the position shown in FIGURE 5 with the valve 159 opening to admit air under pressure to the enlarged lubricant-receiving chamber 158. At this time, the air pressure is rapidly increased to maximum pressure throughout the system and the ball check valve 159 allows a rapid build-up of maximum pressure in air volume chamber 158. At the same time, air under pressure will pass directly through the casing 153 to the port 154 and through the conduit 116 to the cylinder to actuate the piston 111 therein. During this portion of the cycle, no lubricant will be forced to the cylinder.

When the valve 114 is shifted to exhaust the conduit 116, the parts will occupy the position shown in FIGURE 6 with the check valve 159 forced by pressure of air in chamber 158 to a closed position and with air flowing from the cylinder through the conduit 116 and through the injector 152 to the exhaust passage in the valve 114. Under these conditions the pressure in the cylinder 110 will rapidly drop to atmospheric pressure, but ball check valve 159 will immediately move to sealing position as seen in FIGURE 6 so that the pressure in the air-volume chamber 158 is maintained. The volume of compressed air trapped in the chamber 158 will expand and escape through capillary tube 127 to thereby force lubricant in the tube 127 through this tube and the flexible extension 128 thereof and through tube 131 directly into the air cylinder 10. It will be seen that this apparatus functions in a manner very similar to that of FIGURES 1 to 3 except that the lubricant is supplied to the cylinder when the end of the cylinder to which the lubricator is connected is exhausting rather than when it is being supplied with air under pressure.

The system, as shown in FIGURE 4, is adapted to be employed when there is a shut-off valve in the conduit 113 ahead of the lubricator 118. When this shut-off valve is closed the lubricant in the reservoir 123 will not be under pressure so that supply of lubricant through the tube 151 to the lubricator will be discontinued. For installations in which no separate shut-off valve ahead of the valve 114 is provided, the alternative arrangement illustrated in FIGURE 4a is preferably employed. Parts in FIGURE 4a corresponding to like parts in FIGURE 4 are indicated by the same reference numerals, plus 100. As shown in this figure, the lubricator 252 is between the valve 214 and the air cylinder or other device to be operated thereby and a lubricant reservoir 265 is mounted between the valve 214 and the lubricator 252. The reservoir 265 may be connected directly into the conduit 216 so that the upper part of reservoir 265 is subjected to the pressure in conduit 216 and the lower part of reservoir 265 is connected through the tube 251 to the lubricator 252.

In this construction, whenever the valve 214 is in a position to supply pressure to the conduit 216, the reservoir 265 will be under pressure and lubricant will be forced therefrom through the tube 251 into the lubricator 252. When the valve 214 is in its other position to vent the conduit 216 there will be no pressure on the reservoir 265 and the supply of lubricant therefrom to the lubricator will be discontinued. Thus with this construction, flooding of the lubricator and air cylinder is avoided even when there is no shut-off valve in the supply line ahead of the reversing valve 214. The lubricator itself corresponds to that shown in FIGURES 4, 5 and 6 and functions in the same manner.

While several embodiments of the invention have been shown and described herein, it will be understood that they are illustrative only and not to be taken as a definition of the scope of the invention, reference being had for this purpose to the appended claims.

What is claimed is:

1. An injection lubricator system for connection in an air supply conduit comprising a casing having spaced ports therein for connection of the conduit thereto and for flow of air therethrough, means defining a lubricant receiving chamber in the casing, means to supply restricted quantities of a liquid lubricant to said chamber, a tube connected to the chamber and extending downstream from the casing through said conduit and adapted to open into an air cylinder, and a check valve opening toward the chamber and tube to establish communication in one direction between one of the ports and the chamber and tube.

2. The injector lubricator system of claim 1 including a reservoir for liquid lubricant, a restricted connection from the lower part of the reservoir to the chamber to supply lubricant from the reservoir to the chamber, and means establishing communication between the upper part of the reservoir and the air supply conduit to supply pressure to the reservoir to force lubricant therefrom.

3. The injection lubricator system of claim 2 in which the upper part of the reservoir is in communication with one of the ports.

4. The injection lubricator system of claim 1 in which the lubricant receiving chamber is of large volume relative to the tube to store air under pressure for forcing lubricant through the tube.

5. An injection lubricator system for connection in an air supply conduit comprising a casing having spaced ports therein for connection of the conduit thereto and for flow of air therethrough, means defining a lubricant receiving chamber in the casing, means to supply restricted quantities of a liquid lubricant to said chamber, a tube connected to the chamber and extending downstream from the casing through said conduit and adapted to open into an air cylinder, a floating piston normally open at one side to one of the ports and at its other side to the other of the ports and movable in either direction from its normal position to establish a direct connection between the ports, spring means yieldably holding the piston in its normal position and yieldable in either direction in response to pressure differential across the piston, and a check valve opening from one of the ports into the chamber and tube.

6. An injection lubricator, in combination with an air cylinder having an air supply conduit connected to one end thereof and a valve selectively to connect the conduit with a source of air under pressure or to vent it, the lubricator comprising a casing having spaced ports therein connected in the air supply conduit between the valve and the cylinder, means defining a lubricant-receiving chamber in the casing, a tube of small diameter relative to the conduit connecting the lubricant-receiving chamber to the air cylinder, a check valve interposed between said lubricant-receiving chamber and one of said ports to prevent back flow of lubricant through said port, means to establish communication between the lubricant-receiving chamber and tube and one of the ports, and means to supply liquid lubricant to the chamber.

7. The injection lubricator of claim 6 in which the tube extends through one of the ports and through the conduit.

8. An injection lubricator, in combination with an air cylinder having an air supply conduit connected to one end thereof and a valve selectively to connect the conduit with a source of air under pressure or to vent it, the lubricator comprising a casing having spaced ports therein connected in the air supply conduit between the valve and the cylinder, means defining a lubricant-receiving chamber in the casing, a tube of small diameter relative to the conduit connecting the lubricant-receiving chamber to the air cylinder, a check valve connecting the chamber and tube to one of the ports, and a lubricant reservoir connected at its lower end to the chamber and communicating at its upper end with the conduit.

9. The injection lubricator of claim 8 in which the lubricant-receiving chamber is of large volume relative to the tube to store air under pressure for forcing lubricant through the tube.

10. An injection lubricator, in combination with an air cylinder having an air supply conduit connected to one end thereof and a valve selectively to connect the conduit with a source of air under pressure or to vent it, the lubricator comprising a casing having spaced ports therein connected in the air supply conduit between the valve and the cylinder, means defining a lubricant-receiving chamber in the casing, a tube of small diameter relative to the conduit connecting the lubricant-receiving chamber to the air cylinder, a check valve interposed between said lubricant-receiving chamber and one of said ports to prevent back flow of lubricant through said port, means defining a passage connecting the chamber and tube to the port at the valve side of the casing, a floating piston in the casing normally separating the ports and movable in either direction from its normal position to establish a direct connection between the ports, spring means urging the piston toward its normal position and yieldable in either direction, and means to supply liquid lubricant to the chamber.

11. The injection lubricator of claim 10 in which the last named means comprises a lubricant reservoir depending from the casing, a connection from the port at the valve side of the casing to the upper part of the reservoir, and a restricted conduit connecting the lower part of the reservoir to the chamber.

12. An injection lubricator comprising a vertically elongated housing divided into an upper casing portion and a lower reservoir portion, the casing portion having spaced first and second ports therein for connection respectively to a source of supply of air and an air consuming device, means in the casing forming a lubricant-receiving chamber, a tube connected to the chamber and adapted to supply lubricant to the device, a check valve connecting the chamber and tube to the first port, means connecting the upper part of the reservoir to the first port, and a restricted passage connecting the lower part of the reservoir to the chamber to conduct lubricant thereto.

13. An injection lubricator comprising a vertically elongated housing divided into an upper casing portion and a lower reservoir portion, the casing portion having spaced first and second ports therein for connection respectively to a source of supply of air and an air consuming device, means in the casing forming a lubricant-receiving chamber, a tube connected to the chamber and adapted to supply lubricant to the device, a check valve connecting the chamber and tube to the first port, means connecting the upper part of the reservoir to the first port, a restricted passage connecting the lower part of the reservoir to the chamber to conduct lubricant thereto, a floating piston in the casing portion normally separating the ports and movable in either direction from its normal position to establish communication between the ports, and spring means yieldably holding the piston in its normal position.

14. An injection lubricator comprising a vertically elongated housing divided into an upper casing portion and a lower reservoir portion, the casing portion having spaced first and second ports therein for connection respectively to a source of supply of air and an air consuming device, means in the casing forming a lubricant-receiving chamber, a tube connected to the chamber and extending downstream from the casing through said conduit and adapted to supply lubricant to the device, a check valve between the lubricant-chamber and the source of supply of air to prevent back flow of lubricant upon reversal of flow of air through the lubricator, a cylindrical bore in the casing portion communicating adjacent to one end thereof with the first port, the upper part of the reservoir and the chamber and adjacent to the other end thereof with the second port, a piston slidable in the bore normally lying between the ends thereof to separate the ports and movable in either direction to establish communication between the ports, and a conduit connecting the lower part of the reservoir to the chamber to conduct lubricant to the chamber.

References Cited in the file of this patent
UNITED STATES PATENTS

| | | |
|---|---|---|
| 951,234 | Cannon | Mar. 8, 1910 |
| 1,621,771 | Egan | Mar. 22, 1927 |
| 1,721,231 | Osborne | July 16, 1929 |
| 1,978,348 | Hogg | Oct. 23, 1934 |
| 2,308,773 | Norgren et al. | Jan. 19, 1943 |
| 2,868,584 | Faust | Jan. 13, 1959 |
| 2,879,864 | Kupke | Mar. 31, 1959 |
| 2,984,316 | Malec | May 16, 1961 |
| 3,023,849 | Tine | Mar. 6, 1962 |